US012652742B2

(12) United States Patent
Xiong et al.

(10) Patent No.: US 12,652,742 B2
(45) Date of Patent: Jun. 9, 2026

(54) LED LAMP

(71) Applicant: Jiaxing Super Lighting Electric Appliance Co., Ltd., Jiaxing (CN)

(72) Inventors: Aiming Xiong, Jiaxing (CN); Lin Zhou, Jiaxing (CN)

(73) Assignee: Jiaxing Super Lighting Electric Appliance Co., Ltd., Jiaxing (CN)

( * ) Notice: Subject to any disclaimer, the term of this patent is extended or adjusted under 35 U.S.C. 154(b) by 286 days.

(21) Appl. No.: 18/688,437

(22) PCT Filed: Sep. 6, 2022

(86) PCT No.: PCT/CN2022/117264
§ 371 (c)(1),
(2) Date: Oct. 17, 2024

(87) PCT Pub. No.: WO2023/030535
PCT Pub. Date: Mar. 9, 2023

(65) Prior Publication Data

US 2025/0133643 A1 Apr. 24, 2025

(30) Foreign Application Priority Data

Sep. 6, 2021 (CN) ......................... 202111036192.8
Sep. 7, 2021 (CN) ......................... 202111041416.4

(51) Int. Cl.

| | |
|---|---|
| ***H05B 47/17*** | (2020.01) |
| ***H05B 45/10*** | (2020.01) |
| ***H05B 45/20*** | (2020.01) |
| ***H05B 45/325*** | (2020.01) |
| ***H05B 45/375*** | (2020.01) |
| ***H05B 47/155*** | (2020.01) |
| ***H05B 47/165*** | (2020.01) |

(52) U.S. Cl.
CPC ............. *H05B 47/17* (2020.01); *H05B 45/10* (2020.01); *H05B 45/20* (2020.01); *H05B 45/325* (2020.01); *H05B 45/375* (2020.01); *H05B 47/155* (2020.01); *H05B 47/165* (2020.01)

(58) Field of Classification Search
CPC ........ H05B 45/10; H05B 47/17; H05B 45/20; H05B 45/325; H05B 45/375; H05B 47/10; H05B 47/155; H05B 47/165
See application file for complete search history.

(56) References Cited

U.S. PATENT DOCUMENTS

2016/0204652 A1* 7/2016 Han ....................... H02H 3/006 307/66
2020/0256521 A1* 8/2020 Xiong ....................... H05K 1/00
2020/0271279 A1* 8/2020 Xiong ................... F21V 23/005

FOREIGN PATENT DOCUMENTS

CN 2891577 4/2007
CN 207005797 2/2018
(Continued)

*Primary Examiner* — Patrick C Chen
(74) *Attorney, Agent, or Firm* — Muir Patent Law, PLLC

(57) ABSTRACT

An LED lamp with an auxiliary lighting function is provided. The LED lamp comprises a rectifying circuit (510), a filtering circuit (520), a driving circuit (530), a central processing unit (550), an auxiliary power supply module (540), and an LED module. The LED lamp is configured to realize the function of turning on the afterglow illumination after the LED module has been turned off, or when the external power source is turned off, or the function of the nightlight illumination.

10 Claims, 7 Drawing Sheets

(56) References Cited

FOREIGN PATENT DOCUMENTS

| | | | | |
|---|---|---|---|---|
| CN | 207132106 | | | 3/2018 |
| CN | 210112320 | U | | 2/2020 |
| CN | 110912396 | A | | 3/2020 |
| CN | 211860603 | U | | 11/2020 |
| CN | 211959623 | | | 11/2020 |
| CN | 212970169 | | | 4/2021 |
| JP | 2006190657 | | | 7/2006 |
| JP | 2006190657 | A | * | 7/2006 |

* cited by examiner

LED LAMP

CROSS REFERENCE TO RELATED APPLICATIONS

This application is a 371 national stage application of PCT/CN2022/117264 which claims priority to Chinese patent applications, application No. CN202111036192.8, filed on Sep. 6, 2021, and Chinese patent applications, application No.CN202111041416.4, filed on Sep. 7, 2021, which are incorporated by reference herein in their entirety.

TECHNICAL FIELD

The present disclosure relates to the field of LED lighting, and in particular to an LED lamp.

BACKGROUND

LED lights, which are more efficient and cleaner, are gradually taking the place of fluorescent lights in people's day-to-day lives.

In typical scenarios, when an unforeseen power outage occurs and the lights go out, the lighting fixtures are switched off completely. In a dark environment, it becomes extremely inconvenient for people to carry out their activities and can cause discomfort. In general life scenes, when an unexpected power outage occurs or lights go out, the lighting fixtures are completely switched off, and in the dark environment, the human activity is extremely inconvenient, as well as uncomfortable to the people who stay in the dark.

LED lamps equipped with emergency lighting typically come at a higher cost.

In certain lighting scenarios, continuous low-level illumination is needed for nighttime activities without disrupting sleep. To achieve this, a smaller night light needs to be set up separately, which takes up additional space. Alternatively, the night light can be integrated into the lamp, but this often results in uneven luminosity and other issues that can affect the effectiveness of the lamp.

Furthermore, the dimming depth of the driving circuit of general LED lamps typically cannot satisfy the lowest illumination requirement (e.g., 0.1%) needed for night lights.

SUMMARY

For solving the above problem, implementations of the present disclosure are directed to LED lamps with an auxiliary lighting function. More particularly, implementations of the present disclosure are directed to afterglow lighting or nightlight lighting.

Numerous embodiments relating to the present disclosure are described in this summary. However, the term "disclosure" is only used to describe certain embodiments disclosed in this specification (whether in the claims or not), rather than a complete description of all possible embodiments. Certain embodiments of the various features or aspects described below as "the present disclosure" can be combined in various ways to form an LED lamp or a portion thereof.

The present disclosure provides an LED lamp, comprising: a rectifying circuit, electrically connected to an external power source and configured to receive an external power signal and rectify the external power signal to generate a rectified signal; a filtering circuit, electrically connected to the rectifying circuit and configured to receive the rectified signal and filter the rectified signal to generate a filtered signal; a driving circuit, electrically connected to the filtering circuit and configured to receive the filtered signal and performing power conversion to generate a driving signal; a first LED module, electrically connected to the driving circuit and configured to receive the driving signal to light up; an auxiliary power supply module, electrically connected to the filtering circuit and configured to receive the filtered signal and generate an auxiliary power signal; a mains electricity power detecting module electrically connected to the external power source for detecting the state of the external power source and outputting a mains electricity power detection signal; a central processing unit, electrically connected to the auxiliary power supply module to provide electrical power using the auxiliary power signal, and electrically connected to the mains electricity power detecting module to receive the mains electricity power detection signal and to output a first control signal and a second control signal, wherein the first control signal is configured to transmit to the driving circuit to regulate the driving signal; and a second LED module, electrically connected to the central processing unit and configured to light up or turn off based on the second control signal, wherein the second LED module is lit up when a maximum voltage of the external power signal is below a set threshold.

In some embodiments of the present disclosure, the second LED module is turned off when the first LED module lights up.

In some embodiments of the present disclosure, the second LED module lights up when the external power source stops supplying power.

In some embodiments of the present disclosure, the central processing unit comprises: a control circuit configured to process logic control; and an energy storage circuit, electrically connected to the control circuit and the second LED module and configured to provide power to the control circuit and the second LED module when the external power source stops supplying power.

In some embodiments of the present disclosure, the central processing unit comprises: a control circuit configured to process logic control; a first energy storage circuit, electrically connected to the control circuit and configured to provide power to the control circuit when the external power source stops supplying power; and a second energy storage circuit, electrically connected to the second LED module and configured to provide power to the second LED module when the external power source stops supplying power.

In some embodiments of the present disclosure, the central processing unit comprises a control interface, wherein the control interface is configured to receive a dimming signal.

In some embodiments of the present disclosure, the brightness of the second LED module is lower than the brightness of the first LED module, and the second LED module is turned off after being lit up for a period of time.

In some embodiments of the present disclosure, the first energy storage circuit comprises: a first diode, having an anode electrically connected to the auxiliary power supply module; a first resistor, having a first pin electrically connected to a cathode of the first diode; a first capacitor, having a first pin electrically connected to a second pin of the first resistor and having a second pin electrically connected to a common ground end; and a second diode, having an anode electrically connected to the second pin of the first resistor and the first pin of the first capacitor, and having a cathode electrically connected to the control circuit.

In some embodiments of the present disclosure, the second energy storage circuit comprises: a third diode, having an anode electrically connected to the auxiliary power supply module; a second resistor, having a first pin electrically connected to a cathode of the third diode; a second capacitor, having a first pin electrically connected to a second pin of the second resistor and having a second pin electrically connected to the common ground end; and a fourth diode, having an anode electrically connected to the second pin of the second resistor and the first pin of the second capacitor, and having a cathode electrically connected to the second LED module.

In some embodiments of the present disclosure, the central processing unit further comprises: a Zener diode, having an anode electrically connected to the auxiliary power supply module and a cathode electrically connected to the cathode of the second diode; and a linear voltage regulating circuit, electrically connected between the cathode of the Zener diode and the control circuit and configured to form one of power supply paths of the control circuit.

In some embodiments of the present disclosure, the central processing unit further comprises: a delayed conducting circuit, electrically connected between the auxiliary power supply module and the anode of the first diode and configured to disconnect the current path where the first diode is located at the beginning of the activation of the LED lamp so that the power supplied by the auxiliary power supply module is supplied to later-stage through the Zener diode.

The present disclosure provides an LED lamp, comprising: a rectifying circuit, electrically connected to an external power source and configured to receive an external power signal and rectify the external power signal to generate a rectified signal; a filtering circuit, electrically connected to the rectifying circuit and configured to receive the rectified signal and filter the rectified signal to generate a filtered signal; a first driving circuit, electrically connected to the filtering circuit and configured to receive the filtered signal and performing power conversion to generate a first driving signal; an LED module, electrically connected to the first driving circuit and configured to receive the first driving signal to light up; a second driving circuit, electrically connected to the LED module and configured to generate a second driving signal to light up the LED module; an auxiliary power supply module, electrically connected to the filtering circuit and configured to receive the filtered signal and generate an auxiliary power signal; and a central processing unit, electrically connected to the auxiliary power supply module, the first driving circuit, and the second driving circuit, and configured to receive the auxiliary power signal and dim the light by controlling the first driving signal output from the first driving circuit and the second driving signal output from the second driving circuit, wherein the first driving circuit and second driving circuit do not operate simultaneously.

In some embodiments of the present disclosure, the second driving circuit adjusts the brightness of the LED module by changing the proportion of time that the LED module is lit up and turned off, wherein the LED module is lit up and turned off at a frequency greater than or equal to 80 Hz.

In some embodiments of the present disclosure, the first driving circuit has a dimming depth of 1% and the second driving circuit has a dimming depth of 0.1%.

In some embodiments of the present disclosure, the first driving circuit comprises a diode, an inductor, a first transistor, and a driving control circuit. The cathode of the diode is electrically connected to the filtering circuit and the anode of the LED module. The first terminal of the inductor is electrically connected to the anode of the diode, and the second terminal is electrically connected to the cathode of the LED module. The first terminal of the transistor is electrically connected to the anode of the diode and the first terminal of the inductor, while its second terminal is electrically connected to a common ground. The driving control circuit is electrically connected to the control pin of the first transistor and the central processing unit, and is configured to control the conduction state of the first transistor.

In some embodiments of the present disclosure, the second driving circuit comprises a resistor and a second transistor. The first terminal of the resistor is electrically connected to the cathode of the LED module and the second terminal of the inductor. The first terminal of the second transistor is electrically connected to the second terminal of the resistor, its second terminal is electrically connected to the common ground, and its control terminal is electrically connected to the central processing unit.

In some embodiments of the present disclosure, the current flowing through the LED module is controlled by the driving control circuit to satisfy the following equation: $I=D1*(V3-V4)/R6$, where V3 is the voltage of the filtered signal, V4 is the voltage across the LED module, and D1 is the duty cycle of the PWM signal.

In some embodiments of the present disclosure, the LED module comprises a first LED unit with a first color temperature and a second LED unit with a second color temperature. The LED lamp further includes a color temperature adjustment unit. The color temperature adjustment unit is used to control the current passing through the first LED unit and the second LED unit, respectively.

In some embodiments of the present disclosure, the color temperature adjustment unit comprises a first transistor and a second transistor. The first transistor is connected in series with the first LED unit and is controlled by the first PWM signal provided by the central processing unit. The second transistor is connected in series with the second LED unit and is controlled by the second PWM signal provided by the central processing unit.

In some embodiments of the present disclosure, the first PWM signal and the second PWM signal are complementary signals, and the sum of the duty cycles of the first PWM signal and the second PWM signal is 100%.

Through the LED lamp described in the present disclosure, the LED lamp can turn on afterglow lighting after the main lighting is turned off to provide a low illumination environment. Furthermore, the first driving circuit controls the LED module to be lit up for normal lighting, and the second driving circuit controls the LED module to be lit up for night light illumination. The dimming depth of the night light can reach 0.1% to meet the low illumination requirement for night lighting without affecting human sleep.

The details of one or more implementations of the present disclosure are set forth in the accompanying drawings and the description below. Other features and advantages of the present disclosure will be apparent from the description and drawings, and from the claims.

DETAILED DESCRIPTION

The present disclosure proposes specific embodiments of the technical solutions to achieve the aforementioned objectives, features, and advantages in a more straightforward and understandable manner. The detailed explanation of the proposed technical solutions is combined with the accompanying diagrams below. The descriptions of various embodiments of the present disclosure are provided for illustrative purposes only and do not imply that they represent all possible implementations of the present disclosure or limit the invention to specific examples. It should be noted that when an element is referred to as 'set on' another element, it can be directly placed on that element or may also exist as an intermediate component. Similarly, when an element is considered 'connected' to another element, it can be directly linked to that element or may coexist with an intermediate element. The terms 'vertical,' 'horizontal,' 'left,' 'right,' and similar expressions used in the present disclosure are for explanatory purposes and do not imply the exclusive embodiment.

Unless otherwise defined, all technical and scientific terms used herein have the same meaning as commonly understood by those skilled in the art belonging to the present disclosure. Terms used herein in the specification of the present disclosure are used only for the purpose of describing specific embodiments and are not intended to limit the present disclosure. The term "and/or" as used herein includes any and all combinations of one or more of the relevant listed items.

The single resistor in the circuit schematic may be replaced by a plurality of resistors in series or parallel in the actual circuit, and the present disclosure is not limited thereto. Capacitors can also be replaced by a plurality of capacitors in series or parallel.

Figure 1:
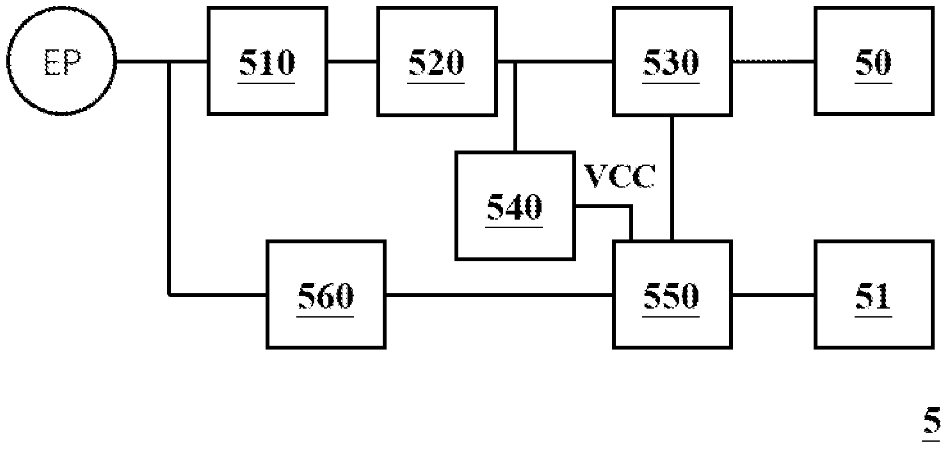
FIG. 1 depicts a schematic circuit block diagram of an LED lamp in accordance with implementations of the present disclosure.

FIG. 1 depicts a schematic circuit block diagram of an LED lamp in accordance with implementations of the present disclosure. The LED lamp 5 comprises a rectifying circuit 510, a filtering circuit 520, a driving circuit 530, a first LED module 50, a second LED module 51, an auxiliary power supply module 540, a mains electricity power detecting module 560, and a central processing unit 550.

The rectifying circuit 510 is electrically connected to the external power source EP and to receive an external power signal and rectify the external power signal to generate a rectified signal (i.e., converting the received AC signal into a DC signal). The filtering circuit 520 is electrically connected to the rectifying circuit 510 to receive the rectified signal and filter the rectified signal to generate a filtered signal.

The driving circuit 530 is electrically connected to the filtering circuit 520 to receive the filtered signal and perform a power conversion to generate a driving signal, wherein the driving signal is a DC signal. The first LED module 50 is electrically connected to the driving circuit 530 to receive the driving signal and light up based on the driving signal. In some embodiments, the first LED module comprises at least one light emitting diode.

The auxiliary power supply module 540 is electrically connected to the filtering circuit 520 to receive the filtered signal and perform a power conversion to generate an auxiliary power signal VCC, wherein the auxiliary power signal VCC is a constant voltage DC signal. In some embodiments, the auxiliary power signal VCC is configured as power supply to be provided to the central processing unit 550.

The mains electricity power detecting module 560 is electrically connected to the external power source EP to detect the external power signal and generate a mains electricity power detection signal. When the voltage peak value of the external power signal is lower than a set threshold, the mains electricity power detecting module 560 determines that there is no power supply from the external power source EP; and when the voltage peak value of the external power signal is higher than or equal to the set threshold, the mains electricity power detecting module 560 determines that there is power supplied from the external power source EP. The mains electricity power detection signal can be configured to indicate the state of the external power source, and when there is power provided from the external power source EP, the mains electricity power detection signal can be set at a high level; when the external power source has no power supplied thereto, the mains electricity power detection signal can be set at a low level.

The central processing unit 550 is electrically connected to the mains electricity power detecting module 560, the driving circuit 530 and the second LED module 51 and is configured to receive the mains electricity power detection signal and output a first control signal and a second control signal. The first control signal can be configured to be transmitted to the driving circuit 530 to adjust the current of the driving signal through controlling the driving circuit 530. The brightness of the first LED module 50 is related to current thereof, and the first LED module 50 can be dimmed by adjusting the current flowing through the first LED module 50. The second control signal can be configured to be transmitted to the second LED module 51 to control the operating state of the second LED module in different circuit configurations. For example, when there is no power supplied from the external power source and the mains electricity power detection signal is at a low level, the central processing unit 530 can output a second control signal (e.g., through some logic operations) to control the second LED module 51 to be lit up.

In some embodiments, the central processing unit 550 comprises a control interface, the control interface can be configured to receive dimming signals or other control signals. The dimming signal can be transmitted to the central processing unit 550 by wired or wireless means, the present disclosure is not limited thereto. The dimming signal can be, for example, a dimming signal ranged from 0-10V, an infrared remote control dimming signal, a PWM dimming signal and the like.

The second LED module 51 is electrically connected to the central processing unit 550 to receive the second control signal to be lit up or turned off. In some embodiments, the first LED module 50 is the primary lighting component, mainly used for illumination under normal conditions, and the second LED module is the auxiliary lighting component, used to provide illumination under special conditions.

The following is a brief description of a use case of the second LED module 51. In some embodiments, when the first LED module 50 is off, the entire environment suddenly changes from bright to pitch-dark, people may not be able to continue the activity in the pitch-dark environment, and the pitch-dark environment is prone to negatively affect people's mental health easily. In some embodiments, when the first LED module 50 is turned off, the second LED module is lit up to provide people with sufficient illumination brightness for normal human activities. At the same time, the brightness of the second LED module 51 is lower than the brightness of the first LED module 50, so as to make it obvious to a person (e.g., a user) that the main lighting component has been turned off, and the auxiliary lighting component is turned on. In addition, the auxiliary lighting can make the brightness of the environment lower, so that the user can have a gradual adaptation to the change in brightness and mental pressure of the user can be alleviated. In some embodiments, the color of the second LED module can be set to be different from the first LED module, which can achieve the effect similar to the above-described, and the present disclosure is not limited thereto. In some examples, the auxiliary lighting may also be referred to as afterglow lighting. In such cases, the afterglow lighting function can be turned on or off through a control interface. When the afterglow function is turned on, after the first LED module 50 has gone out, the second LED module 51 can light up under the control of the second control signal. When the afterglow function is turned off, after the first LED module 50 is off, the second LED module 51 does not light up under the control of the second control signal. As described herein, the second LED module would be automatically turned off after being lit for a period of time.

In some examples, when the mains electricity power fails and the power is unexpectedly cut off, if an emergency lighting equipment is not installed in the room, the dark environment will affect the normal activities of the person. In some embodiments, when the mains electricity power fails, the mains electricity power detecting module 560 determines that the mains electricity power fails, the central processing unit 550 may receive the mains electricity power detection signal and output a second control signal to the second LED module 51 to cause the second LED module 51 to light up to provide auxiliary illumination after the mains electricity power fails. As described herein, in order to ensure that the second LED module is turned on when the mains electricity power is cut off, the afterglow lighting function is set mandatory in such case, i.e., when the mains electricity power is cut off, the second LED module 51 lights up.

Figure 2:
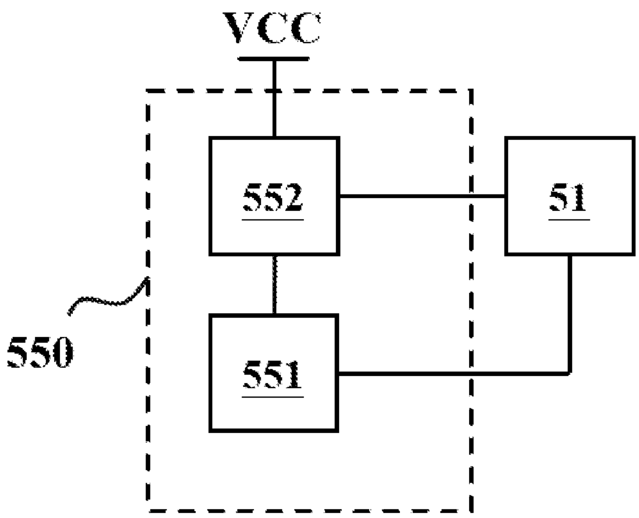
FIG. 2 depicts a schematic circuit block diagram of the central processing unit 550 in accordance with implementations of the present disclosure.

FIG. 2 depicts a schematic circuit block diagram of the central processing unit 550 in accordance with implementations of the present disclosure. The central processing unit 550 includes the control circuit 551 and the first energy storage circuit 552. The first energy storage circuit 552 is electrically connected to the auxiliary power supply module 540, the control circuit 551, and the second LED module 51. The first energy storage circuit 552 receives an auxiliary power signal VCC output from the auxiliary power supply module 540 and stores some of the electrical energy from the auxiliary power signal VCC. When the external power source stops supplying power to the LED lamp 5, (i.e., the auxiliary power supply module 540 also stops outputting the auxiliary power signal VCC), the first energy storage circuit 552 releases the stored electrical energy to the control circuit 551 and the second LED module 51. The control circuit 551 is electrically coupled to the second LED module 51 and is configured to control the illumination/extinction of the second LED module 51.

In some embodiments, the first energy storage circuit 552 provides power to both the control circuit 551 and the second LED module 51 when the external power source stops supplying power.

Figure 3:
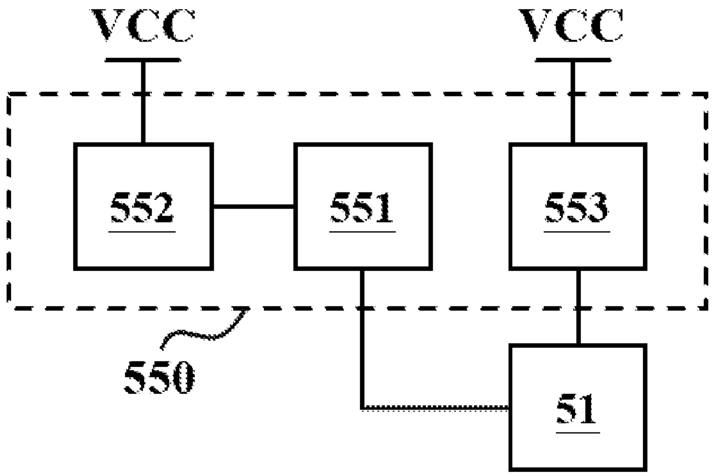
FIG. 3 depicts a schematic circuit block diagram of a central processing unit in accordance with implementations of the present disclosure.

FIG. 3 depicts a schematic circuit block diagram of a central processing unit in accordance with implementations of the present disclosure. The central processing unit 550 comprises a control circuit 551, a first energy storage circuit 552, and a second energy storage circuit 553. The first energy storage circuit 552 is electrically coupled to an auxiliary power supply module 540 to receive an auxiliary power signal VCC and to store a portion from the power auxiliary power signal VCC. The second energy storage circuit 553 is electrically connected to the auxiliary power supply module 540 to receive the auxiliary power signal VCC and store a portion of the electrical energy from the auxiliary power signal VCC. The first energy storage circuit 552 is electrically connected to the control circuit 551 and is configured to provide power to the control circuit 551 when the external power source stops supplying power. The second energy storage circuit 553 is electrically connected to the second LED module 51 and is configured to provide power to the second LED module 51 when the external power source stops supplying power. The central processing unit 550 as described herein is similar to the embodiment described in FIG. 2, with the difference that in the embodiment described in FIG. 2, the control circuit 551 and the second LED module 51 are connected to the same energy storage circuit, and as described herein, the control circuit 551 and the second LED module 51 are connected to different energy storage circuits. With this configuration, the first energy storage circuit 552 can be configured to supply power to the control circuit 551, and the second energy storage circuit 553 can be configured to supply power to the second LED module 51. The influence of the control circuit 551 and the second LED module 51 on each other can be reduced and the circuit can be more stable.

Figure 4:
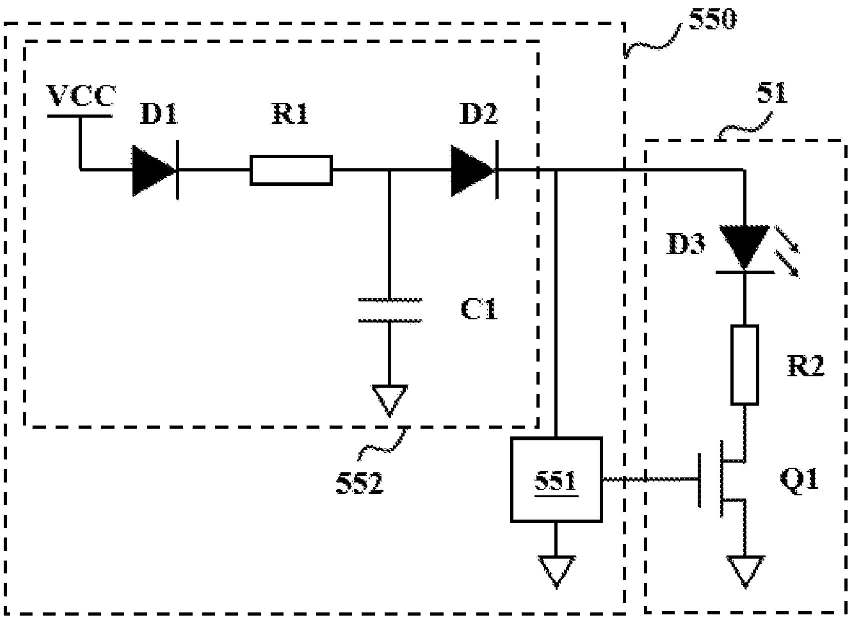
FIG. 4 depicts a schematic circuit structure diagram of a central processing unit in accordance with implementations of the present disclosure.

FIG. 4 depicts a schematic circuit structure diagram of a central processing unit in accordance with implementations of the present disclosure. As shown in FIG. 4, the central processing unit in FIG. 4 provides more details of the central processing unit 550 described in FIG. 2. Specifically, the central processing unit 550 comprises a control circuit 551 and a first energy storage circuit 552. The first energy storage circuit 552 comprises diodes D1, D2, a resistor R1, and a capacitor C1. The anode of the diode D1 is electrically connected to an auxiliary power supply module 540 (e.g., to receive the auxiliary power signal VCC), and the cathode thereof is electrically connected to the first pin of the resistor R1. The second pin of resistor R1 is electrically connected to the anode of the diode D2 and the first pin of the capacitor C1. The second pin of capacitor C1 is electrically connected to a common ground end GND. the cathode of diode D2 is electrically connected to control circuit 551. The second LED module 51 includes a light emitting diode D3, a resistor R2 and a transistor Q1. The anode of light emitting diode D3 is electrically connected to the cathode of diode D2, the cathode thereof is electrically connected to the first pin of resistor R2, and the second pin of resistor R2 is electrically connected to the first pin of transistor Q1. The second pin of the transistor Q1 is electrically connected to a common ground end GND, and the third pin of the transistor Q1 is electrically connected to the control circuit 551.

The operating principle of the central processing unit is described below. When the external power source is available, the auxiliary power supply module 540 provides the auxiliary power signal VCC, the auxiliary power signal VCC can charge the capacitor C1 through the resistor R1. The voltage at both ends of the capacitor C1 gradually rises, and the stored energy thereof gradually increases. When the external power source ceases to be available, the capacitor C1 provides power to the control circuit 551 and the second LED module 551 by releasing the power stored therein. As described herein, when the external power source stops supplying electricity, the control circuit 551 may output the second control signal through the third pin of the transistor Q1 to control the transistor Q1 to be conducted, and the light emitting diode D3 can be lit up.

In some embodiments, the light-emitting diode D3 can be replaced by an LED light-emitting unit, where the LED light-emitting unit can be a plurality of light-emitting diodes connected in series and/or in parallel, and the present disclosure is not limited thereto.

Figure 5:
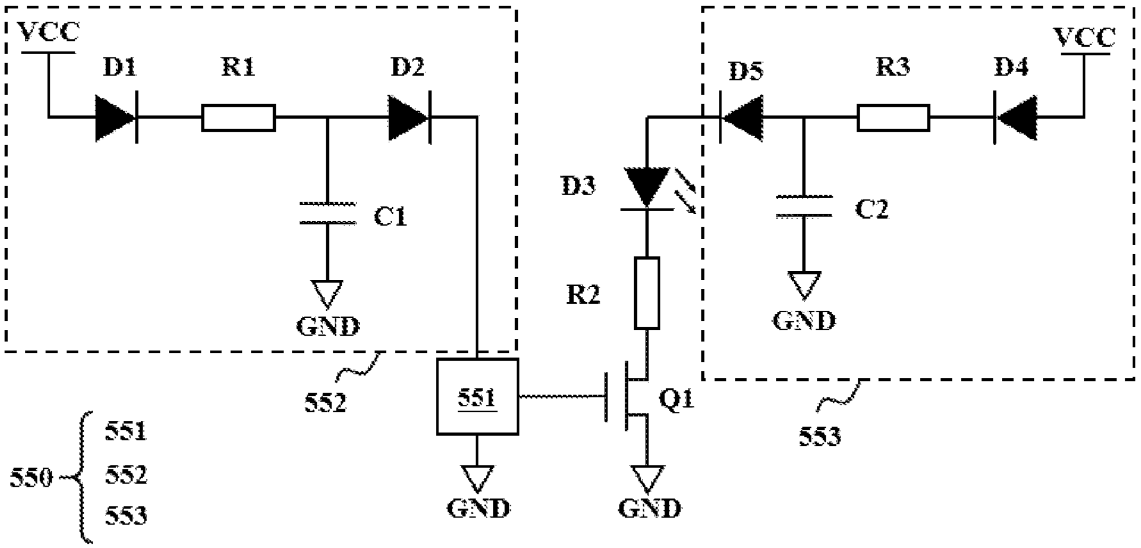
FIG. 5 depicts a schematic circuit structure diagram of a central processing unit in accordance with implementations of the present disclosure.

FIG. 5 depicts a schematic circuit structure diagram of a central processing unit in accordance with implementations of the present disclosure. As shown in FIG. 5, the central processing unit in FIG. 5 provides more details of the central processing unit 550 described in FIG. 3. The central processing unit 550 comprises a control circuit 551, a first energy storage circuit 552, and a second energy storage circuit 553. The first energy storage circuit 552 comprises diodes D1, D2, a resistor R1, and a capacitor C1. The second energy storage circuit 554 comprises diodes D4, D5, a resistor R3, and a capacitor C2. The second LED module 51 comprises a light emitting diode D3, a resistor R2, and a transistor Q1. The anode of the diode D1 is electrically connected to the auxiliary power supply module 540 (e.g., to receive the auxiliary power signal VCC), and the cathode thereof is electrically connected to the first pin of the resistor R1. The second pin of the resistor R1 is electrically connected to the anode of the diode D2 and the first pin of the capacitor C1. The second pin of the capacitor C1 is electrically connected to the common ground end GND. The cathode of diode D2 is electrically connected to the control circuit 551. The anode of diode D4 is electrically connected to the auxiliary power supply module 540 and the cathode thereof is electrically connected to the first pin of the resistor R3. The second pin of the resistor R3 is electrically connected to the anode of the diode D5 and the first pin of the capacitor C2. The second pin of the capacitor C2 is electrically connected to the common ground end GND. The cathode of diode D5 is electrically connected to the anode of the light emitting diode D3. The cathode of the light emitting diode D3 is electrically connected to the first pin of the resistor R2, the second pin of the resistor R2 is electrically connected to the first pin of the transistor Q1, the second pin of the transistor Q1 is electrically connected to the common ground end GND, and the third pin of the transistor Q1 is electrically connected to the control circuit 551.

The embodiment shown in FIG. 5 is similar to the embodiment described in FIG. 4, except that in this embodiment, the central processing unit 550 comprises a second energy storage circuit 553. The first energy storage circuit 552 is electrically coupled to the control circuit 551 to provide power to the control unit 551 when the power supply from the external power source ceases. The second energy storage circuit 553 is electrically connected to the second LED module 51 and is configured to provide power to the second LED module 51 when the external power source stops.

In the embodiment described in FIG. 4, the control circuit 551 and the second LED module 51 are electrically connected to the first energy storage circuit 552, so that when the external power source stops supplying electric power, the electric power is simultaneously supplied from the first energy storage circuit 552 to the control circuit 551 and the second LED module 51. On the other hand, different from the embodiment described in FIG. 4, in the embodiment described in FIG. 5, when the external power source stops supplying electric power, the first energy storage circuit 552 supplies power to the control circuit 551 and the second energy storage circuit 553 provides power to the second LED module 51 when the external power source stops.

In the embodiment described in FIG. 4, when the LED lamp is powered on, the auxiliary power signal VCC first charges the capacitor C1, and when the voltage of the capacitor C1 rises to a rated voltage of the control circuit 551, the control circuit is activated, and the LED lamp operates properly. If only the first energy storage circuit is deployed, in order to maintain the second LED module for a longer operating time after the system is powered down, inevitably, the capacitance of the capacitor C1 has to be set with a larger capacitance value. As described herein, deploying both the first energy storage circuit 552 and the second energy storage circuit 553 to supply power to the control circuit 551 and the second LED module respectively, the capacitance of the capacitor C1 can be set with a smaller capacitance value, and the charging time of the capacitor C1 can also be shorter, so that after the power is supplied, the control circuit 551 can be activated in a shorter period of time, and the activation time of the LED lamp can also be shortened.

Figure 6:
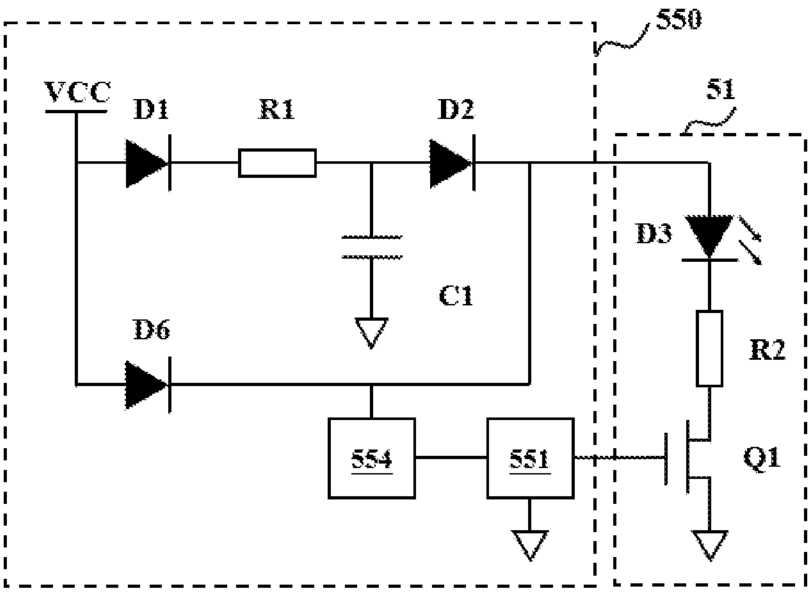
FIG. 6 depicts a schematic circuit structure diagram of a central processing unit in accordance with implementations of the present disclosure.

FIG. 6 depicts a schematic circuit structure diagram of a central processing unit in accordance with implementations of the present disclosure. The circuit structure of the central processing unit 550 shown in FIG. 6 is similar to that of the embodiment described in FIG. 4, with the difference that, the central processing unit 550 shown in FIG. 6 further comprises a linear voltage stabilizing circuit 554 and a diode D6. The anode of the diode D1 is electrically connected to the auxiliary power supply module 540, and the cathode thereof is electrically connected to the first pin of the resistor R1. The second pin of the resistor R1 is electrically connected to the anode of the diode D2 and the first pin of the capacitor C2. The second pin of the capacitor C1 is electrically connected to the common ground end GND. The cathode of diode D2 is electrically connected to the anode of the light emitting diode D3. The anode of the diode D6 is electrically connected to the anode of diode D1, and the cathode thereof is electrically connected to the cathode of the diode D2. The linear voltage regulating circuit 554 is electrically connected to the cathode of the diode D6 and to the control circuit 551. The circuit structure of the second LED module 51 is similar to the aforementioned embodiments and will not be repeated herein.

When the external power source is activated and supplies power, the auxiliary power signal VCC charges the capacitor C1 through the resistor R1 and also provides power to the linear voltage regulating circuit 554 through the diode D6. The central processing unit 550 comprises a dual-path power supply structure, with a first power supply path formed by the diode D6 and the linear voltage regulating circuit 554, and a second power supply path formed by the first energy storage circuit 552 and the linear voltage regulating circuit 554. Both the first power supply path and the second power supply path can provide power to the control circuit 551 when power is provided by an external power source. When the external power source stops supplying power, the power can be provided to the control circuit 551 by the first power supply path formed by the first energy storage circuit 552. With the circuit structure shown in FIG. 6, when the LED lamp is powered up, the second power supply path can quickly provide power to the control circuit, so that the LED lamp can be activated faster.

Figure 7:
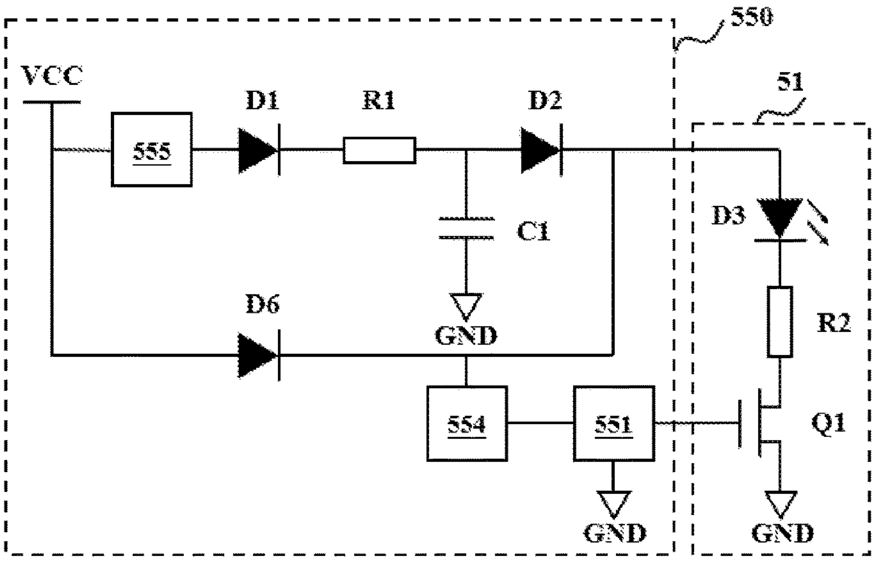
FIG. 7 depicts a schematic circuit structure diagram of a central processing unit in accordance with implementations of the present disclosure.

FIG. 7 depicts a schematic circuit structure diagram of a central processing unit in accordance with implementations of the present disclosure. The circuit structure of the central processing unit 550 shown in FIG. 7 is similar to that of the embodiment described in FIG. 6, with the difference that, in FIG. 7, the central processing unit 550 further comprises a delayed conducting circuit 555. The delayed conducting circuit 555 is electrically connected between the diode D1 and the auxiliary power supply module 540. When the LED lamp is powered on, the delayed conducting circuit 555 is in an off state, and the auxiliary power signal VCC provides power to the control circuit 551 through the diode D6 and the linear voltage regulating circuit 554. After a set time t1, the delayed conducting circuit 555 is on, and the auxiliary power signal VCC charges the capacitor C1 through the resistor R1. Through the circuit structure shown in FIG. 7, when the LED lamp is powered on, the control circuit 551 first obtains power and works properly. The auxiliary power signal VCC charges the first energy storage circuit 552 only after the set time t1. As a result, the LED lamp can obtain a faster start-up speed.

In some embodiments, the set time t1 can be set by modifying the parameters of the components in the delayed conducting circuit 555.

Figure 8:
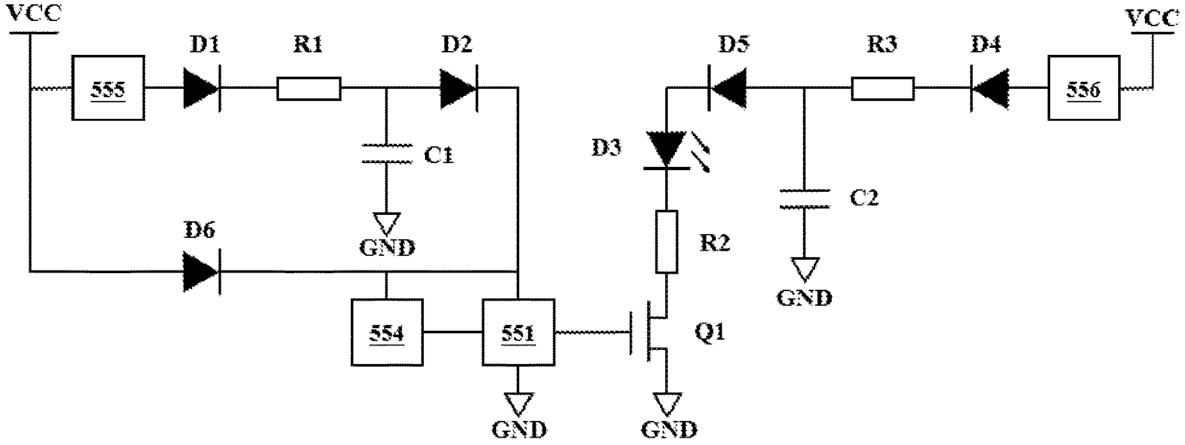
FIG. 8 depicts a schematic circuit structure diagram of a central processing unit in accordance with implementations of the present disclosure.

FIG. 8 depicts a schematic circuit structure diagram of a central processing unit in accordance with implementations of the present disclosure. The circuit structure of the central processing unit 550 in FIG. 8 is similar to that of the embodiment described in FIG. 7, with the difference that in FIG. 8, the central processing unit 550 further comprises a second energy storage circuit 553 which is also shown in FIG. 5 and a delayed conducting circuit 556. The delayed conducting circuit 556 is electrically coupled between the second energy storage circuit 553 and the auxiliary power supply module 540. The circuit structure of the second energy storage circuit 530 is the same as that of the embodiment described in FIG. 5 and will not be repeated herein. Referring also to the embodiment described in FIG. 7, in the embodiment described in FIG. 8, the delayed conducting circuit 555 and the delayed conducting circuit 556 may control the charging time of the auxiliary power signal VCC to the first energy storage circuit 552 and the second energy storage circuit 553, respectively. When the lamp is powered on, the delayed conducting circuits 555 and 556 are in a disconnected state, and the auxiliary power signal VCC is first supplied as power to the control circuit 551, causing the LED lamp to be enabled and enter an operating state. When time t1 has elapsed, the delayed conducting circuit 555 is on, and the auxiliary power signal VCC charges the first energy storage circuit 552, and when time t2 has elapsed, the delayed conducting circuit 556 is on, and the auxiliary power signal VCC charges the second energy storage circuit 554. By setting the component parameters of the delayed conducting circuits 555 and 556 so that the time t1 #the time t2, the delayed conducting circuits 555 may first be conducted when the time t1<the time t2, and the delayed conducting circuits 556 may first be conducted when the time t1>the time t2.

By the circuit structure shown in FIG. 8, the control circuit 551 can enter a normal operating state first when the system is powered up, reducing the startup time of the system. As previous described, the control circuit 551 is powered by the auxiliary power signal VCC. To prevent the charging of the first energy storage circuit 552 and the second energy storage circuit 553 from affecting the auxiliary power signal VCC signal and causing the increase of the startup time of the system, the first energy storage circuit 552 and the second energy storage circuit 553 are delayed from entering the charging state.

Figure 9:
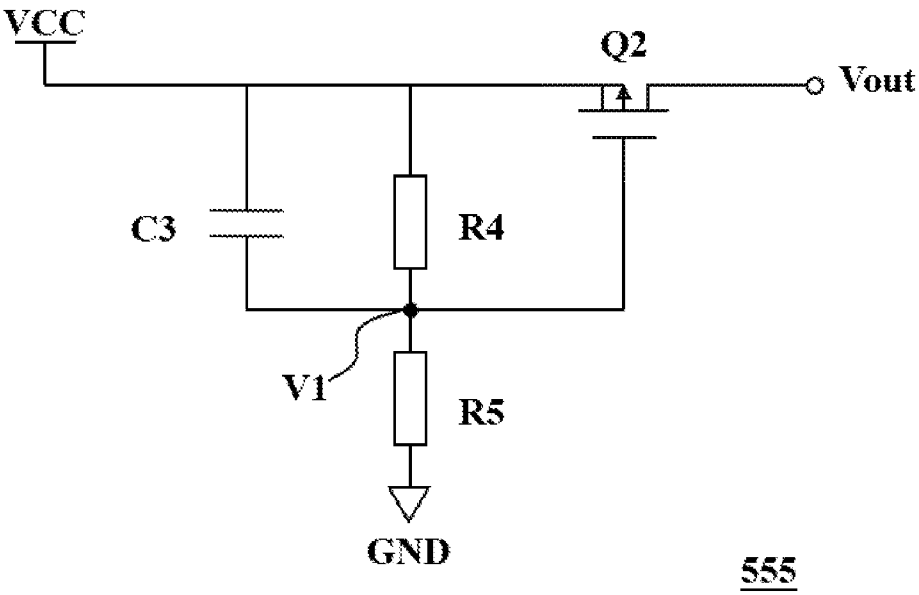
FIG. 9 depicts a schematic circuit structure diagram of a delayed conducting circuit in accordance with implementations of the present disclosure.

FIG. 9 depicts a schematic circuit structure diagram of a delayed conducting circuit in accordance with implementations of the present disclosure. Referring to FIG. 9, the delayed conducting circuit 555 comprises a capacitor C3, resistors R4, R5, and a transistor Q2. The first pin of the capacitor C3 is electrically connected to the auxiliary power supply module 540, the first pin of the resistor R4, and the first pin of the transistor Q2. The second pin of the capacitor C3 is electrically connected to the second pin of the resistor R4, the first pin of the resistor R5, and the third pin of the transistor Q2. The second pin of capacitor C3 is electrically connected to the second pin of resistor R4, the first pin of resistor R5, and the third pin of transistor Q2. The second pin of resistor R5 is electrically connected to the common ground end GND. The second pin of transistor Q2 is the output end of the delayed conducting circuit.

The operating principle of the delayed conducting circuit 555 is described as follows. The voltage at the second pin of the resistor R4 is set as V1, when the system is powered on, because the voltage at both ends of the capacitor C3 is not able to change abruptly, the voltage value V1 is gradually reduced from the voltage value of VCC to V2, wherein the voltage value V2 satisfies the following equation:

$$V2 = VCC * R5/(R4 + R5).$$

In some embodiments, the transistor Q2 is a PMOS transistor, and $V2 < V_{GS}$, where $V_{GS}$ is the conducting voltage of the transistor Q2.

When the condition $V1 < V_{GS}$ is satisfied, the transistor Q2 is in the conducting state, and the power signal VCC can be transmitted through the transistor Q2 to the output end Vout of the delayed conducting circuit. The time interval t2 between system power-on and entering the conducting state of the transistor Q2 can be adjusted by controlling the parameters of the resistors R4, R5 and the capacitor C3, where the time interval t2 satisfies the following equation:

$$t2=(R4//R5)*C3*\ln[(V2-Vcc)/(V2-(Vcc-|Vgs|)],$$

where (R4//R5) represents the resistance value of the resistors R4 and R5 after they are connected in parallel, and in some embodiments, the voltage value $V_{GS}\approx-3V$.

By the deployments described above, the LED lamp can be set to have a first LED module and a second LED module, where the first LED module can be configured as the main illumination, and the second LED module can be configured to provide a short afterglow illumination after the first LED module is turned off or when the external power source is disconnected. In some embodiments, when the afterglow illumination is activated, the afterglow illumination can still be turned off or on through the control interface.

Figure 10:
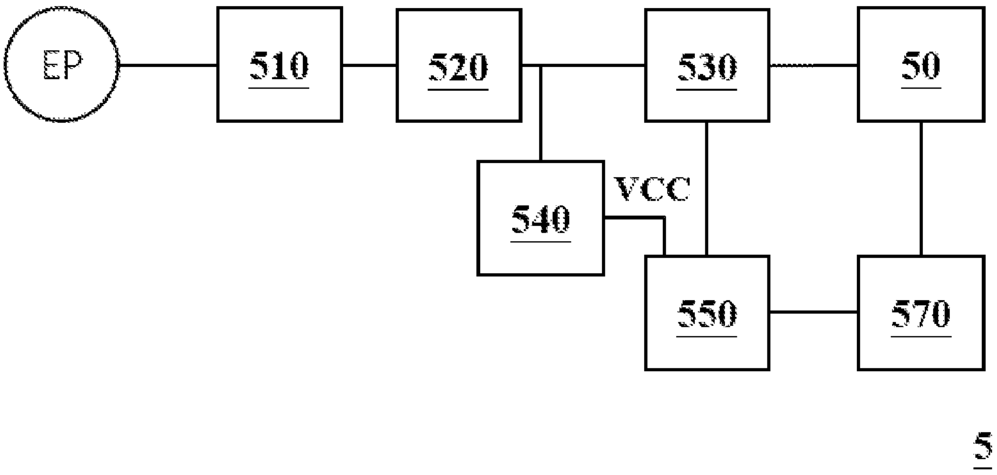
FIG. 10 depicts a schematic circuit block diagram of an LED lamp in accordance with implementations of the present disclosure.

FIG. 10 depicts a schematic circuit block diagram of an LED lamp in accordance with implementations of the present disclosure. Referring FIG. 10, the LED lamp 5 comprises a rectifying circuit 510, a filtering circuit 520, a first driving circuit 530, an LED module 50, an auxiliary power supply module 540, a central processing unit 550, and a second driving circuit 570. The rectifying circuit 510 is electrically coupled to an external power source EP to receive an external power signal and rectify the external power signal to generate a rectified signal. The filtering circuit 520 is electrically connected to the rectifying circuit 510 to receive the rectified signal and filter the rectified signal to generate the filtered signal. The first driving circuit 530 is electrically connected to the filtering circuit 520 to receive the filtered signal and perform a power conversion to generate the first driving signal. The LED module 50 is electrically connected to the driving circuit 530 to receive the first driving signal and light up. The auxiliary power supply module 540 is electrically connected to the filtering circuit 520 to receive the filtered signal and perform a power conversion to generate an auxiliary power signal VCC. The central processing unit 550 is electrically connected to the auxiliary power supply module 540 to receive the auxiliary power signal VCC as power supply. The central processing unit 550 is electrically connected to the first driving circuit 530 and is configured to dim the light by controlling the first driving signal output by the first driving circuit 530. The central processing unit 550 is electrically connected to the second driving circuit 570 and is configured to adjust the second driving signal output by the second driving circuit 570. The second driving circuit 570 is electrically connected to the LED module 50 and is configured to output the second driving signal to the LED module 50 so the LED module can be lit up. In some embodiments, the first driving circuit 530 and the second driving circuit 570 are both connected to the LED module 50 and can both be used to light up the LED module 50. The first driving circuit 530 can be configured as the main driving circuit for illuminating the LED lamp under normal conditions, and the second driving circuit 570 can be configured as the secondary driving circuit for low-illumination lighting at night.

In some embodiments, the first driving circuit 530 is a BUCK-type power converting circuit with a dimming depth around 1%. If the first driving circuit 530 is set to dim the LED module 50 for use as a night light, the minimum brightness thereof still cannot meet the low illumination requirements of the night light, so as described herein, the second driving circuit 570 is set to drive the LED module 50 for use as a night light. The dimming depth of the second driving circuit 570 can reach 0.1%.

In some embodiments, the auxiliary power signal VCC is a low-voltage DC signal.

In some embodiments, the auxiliary power signal VCC has a voltage range of 3.3-30V.

Figure 14:
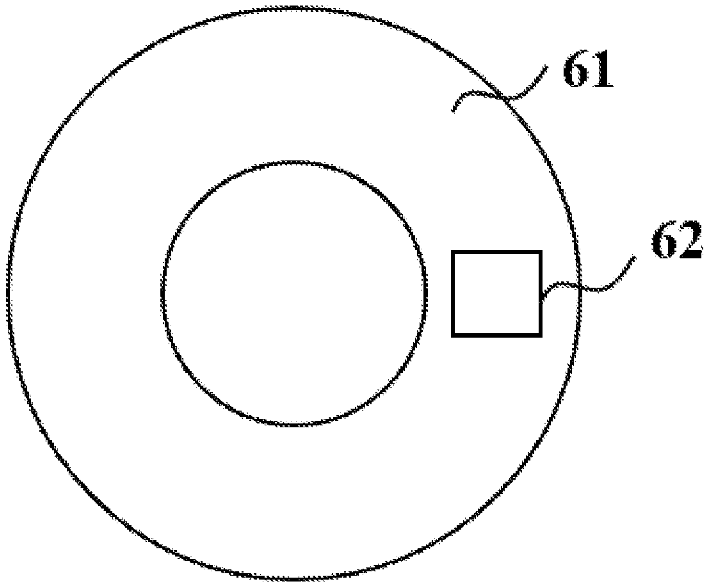
FIG. 14 depicts a schematic diagram of the light-emitting area of a circular ceiling lamp in accordance with implementations of the present disclosure.

In some embodiments, the main illumination is configured by driving the LED module 50 with the first driving circuit 530 and the night light illumination is configured by driving the LED module 50 with the second driving circuit 570. The configuration of setting the LED module 50 as a light-emitting unit for the night light allows the emitting light of the night light illumination to be more even. FIG. 14 depicts a schematic diagram of the light-emitting area of a circular ceiling lamp in accordance with implementations of the present disclosure. In some examples, the LED module 50 is generally uniformly provided in the circular area 61, and the LED module 50 can be lit up in the normal lighting mode. One or several LED beads are additionally set in the square region 62, and when the small night light is lit, only the square region 62 is lit, resulting in an uneven light-emitting region as a whole. If the above-described deployment of the present disclosure is adopted, when the night light is lit up, the LED module 50 is lit up, and light-emitting area thereof is the same as in the normal lighting mode and the light-emitting area can be more uniform (i.e., the whole circular area 61 is emitted uniformly during night light mode).

Figure 11:
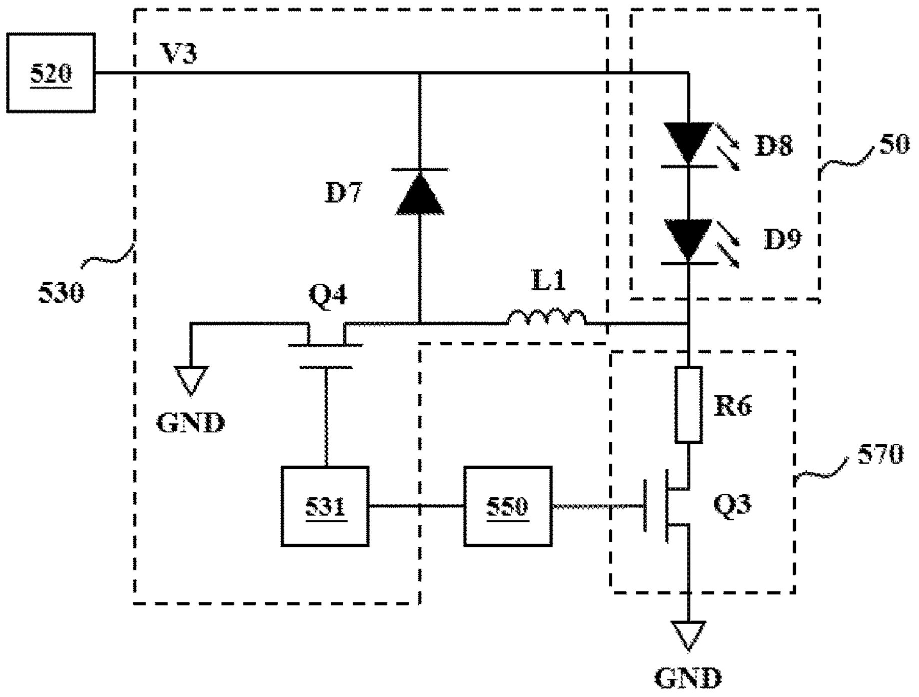
FIG. 11 depicts a schematic circuit structure diagram of a first driving circuit and a second driving circuit in accordance with implementations of the present disclosure.

FIG. 11 depicts a schematic circuit structure diagram of a first driving circuit and a second driving circuit in accordance with implementations of the present disclosure. Referring FIG. 11, the first driving circuit 530 includes a diode D7, an inductor L1, a transistor Q4, and a driving control circuit 531. The LED module 50 includes light emitting diodes D8 and D9. The second driving circuit 570 includes a transistor Q3 and a resistor R6. The cathode of the diode D7 is electrically connected to the filtering circuit 520 and the anode of the light emitting diode D8, and anode thereof is electrically connected to the second pin of the transistor Q4 and the first pin of the inductor L1. The second pin of the inductor L1 is electrically connected to the cathode of the light emitting diode D9 and the first pin of the resistor R6. The second pin of the transistor Q4 is electrically connected to the driving control circuit 531 and the third pin thereof is electrically connected to the common ground end GND. The second pin of the transistor Q3 is electrically connected to the common ground end GND, and the third pin thereof is electrically connected to the central processing unit 550. The driving control circuit 531 is electrically connected to the central processing unit 550.

The operating principle of the first driving circuit is described below. In some embodiments, the first driving circuit is a BUCK-type power converting circuit, which performs a step-down conversion to the received filtered signal to generate a first driving signal to light up the LED module 50, and the driving control circuit 531 adjusts the current of the first driving signal by controlling the duty cycle of the conduction of the transistor Q4, so the brightness of the LED module 50 can be adjusted thereby.

Although the first driving circuit 530 can adjust the brightness of the LED module 50 by adjusting the current of the first driving signal, the dimming depth of the first driving circuit 530 can only reach around 1%, which cannot meet the requirement for smaller dimming depth of the night light. The second driving circuit 530 has the same load as the first driving circuit 530, which is the LED module 50, and when the second driving circuit 570 is used to drive the LED module 50, the first driving circuit 530 is disabled, i.e., the transistor Q4 is in a disconnected state. When transistor Q3 is on, the current I flowing through the LED module 50 may satisfy the following relation:

$$I=(V3-V4)/R6,$$

where V3 is the voltage of the filtered signal and V4 is the voltage between both ends of the LED module 50 and when transistor Q3 is on, the voltage between first and second pins thereof is small and negligible.

In some embodiments, the central processing unit 550 controls the conduction and cutoff of the transistor Q3 by the PWM signal. When the PWM signal is at a high level, the transistor Q3 is in the conducting state, and the LED module 50 is lit up. When the PWM signal is at a low level, the transistor Q3 is in the cut-off state, and the LED module is turned off, and the ratio of the LED module being lit up and turned off can be adjusted by managing the duty cycle of the PWM signal. The brightness of the LED module can be increased when the ratio of the lighting-up becomes higher and when the ratio of lighting-up becomes lower, the brightness of the LED module 50 decreases. When the frequency of the PWM signal is greater than or equal to 80 Hz, the human eye would not be able to detect such flickering, and it can be viewed as the LED module is always in the lit up state.

When the brightness of the LED module 50 is adjusted based on the PWM signal, the current I flowing through the LED module 50 may satisfy the following equation:

$$I=D1*(V3-V4)/R6,$$

wherein, V3 is the voltage of the filtered signal, V4 is the voltage between the two ends of the LED module 50, D1 is the duty cycle of the PWM signal, and when the transistor Q3 is in the conducting states, the voltage between the first and second pins thereof is very small and negligible.

By adopting the configurations described above, the dimming depth of the LED module 50 can be made to reach 0.1%, which can reduce the brightness of the night light to a sufficiently small level to meet the lighting needs in different environments. It may be, for example, that in a sleeping environment, dimming the brightness of the night light to 0.1% can meet the basic lighting needs at night without affecting a person's sleep.

In some embodiments, the central processing unit 550 comprises a control interface through which dimming signals or other operating commands can be sent to the central processing unit, which can be, for example, to enable or disable the first driving circuit 530 and/or the second driving circuit 570, to dim the light using the first driving circuit 530, to dim the light using the second driving circuit 570, and the like.

In some embodiments, the control interface of the central processing unit 550 can be an infrared receiving unit configured to receive infrared control signals, where the infrared control signals can further comprise dimming signals or other operating instructions.

In some embodiments, the LED module 50 comprises a plurality of light emitting diodes connected in series and/or in parallel, and the present disclosure is not limited thereto.

Figure 12:
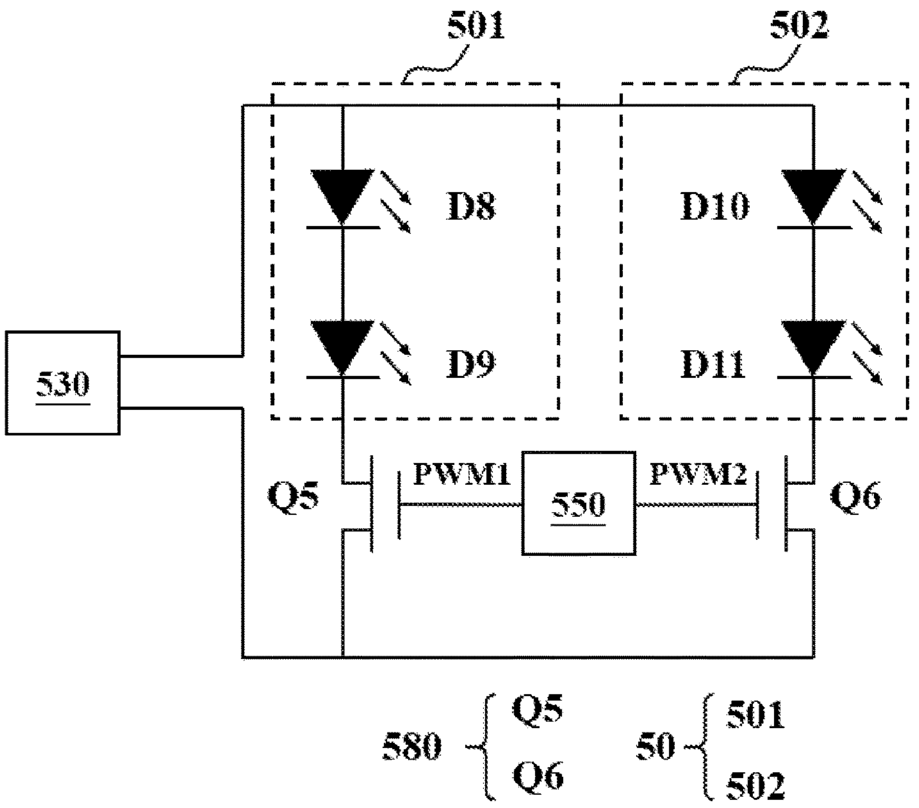
FIG. 12 depicts a schematic circuit structure diagram of the LED module 50 in accordance with implementations of the present disclosure.

FIG. 12 depicts a schematic circuit structure diagram of the LED module 50 in accordance with implementations of the present disclosure. Referring FIG. 12, the LED module 50 comprises a first LED unit 501 and a second LED unit 502. The first LED unit 501 comprises light emitting diodes D8 and D9, and the second LED unit comprises light emitting diodes D10 and D11. The LED lamp further comprises a color temperature adjustment unit 580, and the color temperature adjustment unit 580 comprises transistors Q5 and Q6. The anode of the light emitting diode D8 is electrically connected to the anode of the light emitting diode D10 and electrically connected to the first driving circuit 530. The anode of the light emitting diode D8 is electrically connected to the anode of the light emitting diode D10 and electrically connected to the first driving circuit 530. The anode of the light emitting diode D9 is electrically connected to the cathode of the light emitting diode D8, and the cathode of the light emitting diode D9 is electrically connected to the first pin of the transistor Q5. The anode of the light emitting diode D11 is electrically connected to the cathode of the light emitting diode D10, the cathode thereof is electrically connected to the first pin of the transistor Q6. The second pin of the transistor Q5 is electrically connected to the central processing unit 550, and the second pin of the transistor Q6 is electrically connected to the central processing unit 550. The third pin of the transistor Q5 is electrically connected to the third pin of the transistor Q6 and is electrically connected to the first driving circuit 530.

Figure 13:
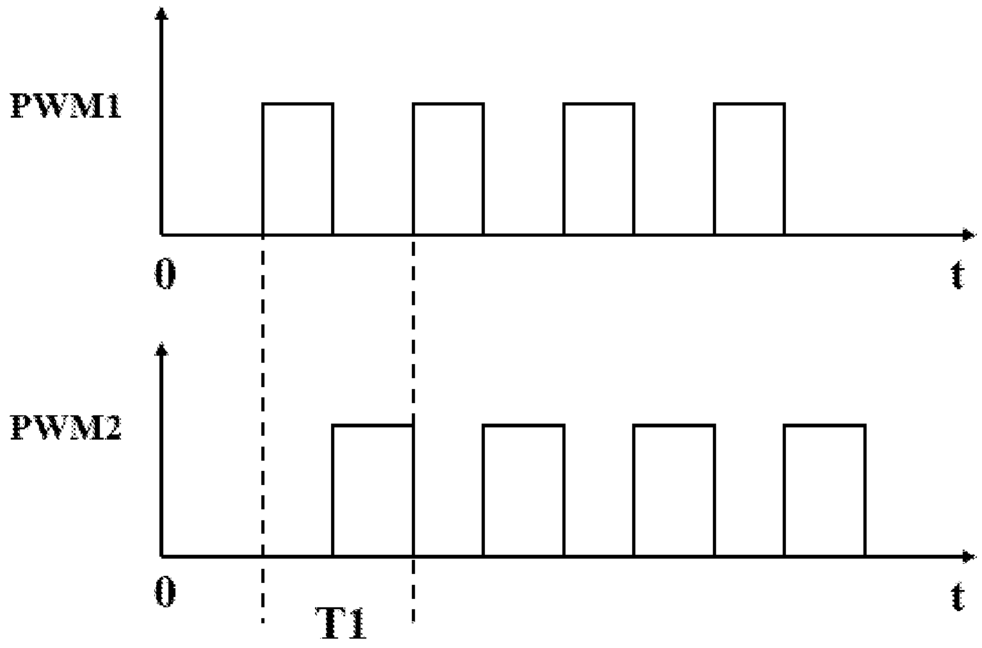
FIG. 13 depicts a schematic diagram of the signal waveforms PWM1 and PWM2 in accordance with implementations of the present disclosure.

The operating principle of color temperature adjustment of the LED lamp 5 is described below. In some embodiments, the first LED unit 501 and the second LED unit 502 can be set to have different color temperatures, and the color temperature of the LED lamp is adjusted by controlling the lighting time of the first LED unit 501 and the second LED unit 502. The central processing unit 550 controls the conduction and cut-off of the transistors Q5 and Q6 by means of PWM signals. When the transistor Q5 is on, the first LED unit 501 is lit up, and when the transistor light Q6 to on, the second LED unit 502 is lit up. In some embodiments, transistors Q5 and Q6 do not conduct at the same time. Referring also to FIG. 13, PWM1 is a PWM signal for the central processing unit 550 to control transistor Q5, and PWM2 is a PWM signal for the central processing unit to control transistor Q6. When the PWM1 signal is at a high level, transistor Q5 conducts, and when the PWM1 signal is at a low level, transistor Q5 cuts off. Similarly, when the PWM 2 signal is at a high level, transistor Q6 conducts, and when the PWM2 signal is at a low level, transistor Q6 cuts off. The signals PWM1 and PWM2 have the same frequency, and in a frequency cycle T1, when the signal PWM1 is high, the signal PWM2 is at a low level. When the duty cycle of PWM1 becomes large, the average current flowing through the first LED unit 501 becomes large, and the brightness of the first LED unit 501 increases. Meanwhile, the duty cycle of PWM2 decreases, and the average current flowing through the second LED unit 502 decreases, and the brightness of the second LED unit 502 decreases. Since the color temperature of the first LED unit 501 and the second LED unit 502 are different, and when the brightness of the two LED units 501 and 502 changes, the color temperature of the overall LED lamp changes.

In some embodiments, the color temperature of the first LED unit 501 is set as 4000 k, and the color temperature of the second LED unit 502 is set as 6000 k. When the duty cycle of PWM1 is 100%, the duty cycle of PWM2 is 0%, the first LED unit 501 lights up, the second LED unit 502 goes out, and the color temperature of the whole lamp is 4000 k. Similarly, when the duty cycle of PWM1 is 0%, the duty cycle of PWM2 is 100%, the first LED unit 501 goes out, the second LED unit 502 lights up, and the color temperature of the whole lamp is 6000 k. When the duty cycle of PWM1 is 50%, the duty cycle of PWM2 is 50%, the first LED unit 501 and the second LED unit are in the lighting-up state, and the color temperature of the whole lamp is about 5000 k. The color temperature of the whole lamp can be changed by changing the duty cycle of PWM1.

With the configurations mentioned above, the first driving circuit 530 and the second driving circuit 570 drive the LED module 50 to light up in different manners. The first driving circuit 530 drives the LED module 50 for daily lighting, and the second driving circuit 570 drives the LED module 50 for night light lighting. In some embodiments, the first driving circuit 530 and the second driving circuit 570 do not operate simultaneously. Compared to the first driving circuit 530, the second driving circuit 570 is capable of achieving a lower dimming depth (e.g., 0.1% and below), so that the brightness of the night light is lower, which satisfies the basic lighting requirements at night without interfering with a person's sleep.

In some embodiments, color temperature adjustment can also be achieved when the LED module 50 is driven by the second driving circuit 570.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. An LED lamp, comprising:

a rectifying circuit, electrically connected to an external power source and configured to receive an external power signal and rectify the external power signal to generate a rectified signal;

a filtering circuit, electrically connected to the rectifying circuit and configured to receive the rectified signal and filter the rectified signal to generate a filtered signal;

a driving circuit, electrically connected to the filtering circuit and configured to receive the filtered signal and performing power conversion to generate a driving signal;

a first LED module, electrically connected to the driving circuit and configured to receive the driving signal to light up;

an auxiliary power supply module, electrically connected to the filtering circuit and configured to receive the filtered signal and generate an auxiliary power signal;

a mains electricity power detecting module electrically connected to the external power source for detecting the state of the external power source and outputting a mains electricity power detection signal;

a central processing unit, electrically connected to the auxiliary power supply module to provide electrical power using the auxiliary power signals, and electrically connected to the mains electricity power detecting module to receive the mains electricity power detection signals and to output a first control signal and a second control signal, wherein the first control signal is configured to be transmitted to the driving circuit to regulate the driving signal; and a second LED module, electrically connected to the central processing unit and configured to light up or turn off based on the second control signal, wherein the second LED module is lit up when a maximum voltage of the external power signal is below a set threshold, wherein the central processing unit comprises:

a control circuit configured to process logic control;

a first energy storage circuit, electrically connected to the control circuit and configured to provide power to the control circuit when the external power source stops supplying power; and a second energy storage circuit, electrically connected to the second LED module and configured to provide power to the second LED module when the external power source stops supplying power, wherein the first energy storage circuit comprises:

a first diode, having an anode electrically connected to the auxiliary power supply module;

a first resistor, having a first pin electrically connected to a cathode of the first diode;

a first capacitor, having a first pin electrically connected to a second pin of the first resistor and having a second pin electrically connected to a common ground end; and a second diode, having an anode electrically connected to the second pin of the first resistor and the first pin of the first capacitor, and having a cathode electrically connected to the control circuit, and wherein the second energy storage circuit comprises:

a third diode, having an anode electrically connected to the auxiliary power supply module;

a second resistor, having a first pin electrically connected to a cathode of the third diode;

a second capacitor, having a first pin electrically connected to a second pin of the second resistor and having a second pin electrically connected to the common ground end; and a fourth diode, having an anode electrically connected to the second pin of the second resistor and the first pin of the second capacitor, and having a cathode electrically connected to the second LED module.

2. The LED lamp of claim 1, wherein the second LED module is turned off when the first LED module lights up.

3. The LED lamp of claim 1, wherein the second LED module lights up when the external power source stops supplying power.

4. The LED lamp of claim 1, wherein the central processing unit comprises a control interface, wherein the control interface is configured to receive a dimming signal.

5. The LED lamp of claim 1, wherein the brightness of the second LED module is lower than the brightness of the first LED module, and the second LED module is turned off after being lit up for a period of time.

6. The LED lamp of claim 1, wherein the central processing unit further comprises:

a Zener diode, having an anode electrically connected to the auxiliary power supply module and a cathode electrically connected to the cathode of the second diode; and a linear voltage regulating circuit, electrically connected between the cathode of the Zener diode and the control circuit and configured to form one of power supply paths of the control circuit.

7. The LED lamp of claim 6, wherein the central processing unit further comprises:

a delayed conducting circuit, electrically connected between the auxiliary power supply module and the anode of the first diode and configured to disconnect the current path where the first diode is located at the beginning of the activation of the LED lamp, so that the power supplied by the auxiliary power supply module is supplied to later-stage through the Zener diode.

8. The LED lamp of claim 1, wherein the driving circuit comprises:

a first driving circuit, electrically connected to the filtering circuit and configured to receive the filtered signal and perform power conversion to generate a first driving signal; and a second driving circuit, electrically connected to the LED module and configured to generate a second driving signal to light up the first LED module, wherein, the central processing unit is configured to dim the light by controlling the first driving signal output from the first driving circuit and the second driving signal output from the second driving circuit, wherein the first driving circuit and second driving circuit do not operate simultaneously.

9. The LED lamp of claim 8, wherein the second driving circuit is configured to adjust the brightness of the LED module by changing the proportion of time that the LED module is lit up and turned off, wherein the LED module is lit up and turned off at a frequency greater than or equal to 80 Hz.

10. The LED lamp of claim 8, wherein the first driving circuit has a dimming depth of 1% and the second driving circuit has a dimming depth of 0.1%.

* * * * *